(12) United States Patent
Nakamura et al.

(10) Patent No.: US 8,016,338 B2
(45) Date of Patent: Sep. 13, 2011

(54) SEAT-FORM STORAGE APPARATUS

(75) Inventors: Mitsuyoshi Nakamura, Wako (JP); Toru Matsui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/699,355

(22) Filed: Feb. 3, 2010

(65) Prior Publication Data

US 2010/0194133 A1 Aug. 5, 2010

(30) Foreign Application Priority Data

Feb. 4, 2009 (JP) .................................. 2009-023889

(51) Int. Cl.
*B60R 7/04* (2006.01)

(52) U.S. Cl. ................ 296/37.15; 296/37.14; 296/65.01
(58) Field of Classification Search ............... 296/37.15, 296/37.14, 66, 65.01, 65.03, 69; 297/188.04, 297/188.09, 188.1
See application file for complete search history.

(56) References Cited

U.S. PATENT DOCUMENTS

| | | | | |
|---|---|---|---|---|
| 3,088,771 | A * | 5/1963 | Weigle | 296/37.5 |
| 5,902,009 | A * | 5/1999 | Singh et al. | 297/188.1 |
| 6,079,773 | A * | 6/2000 | Hassan | 297/188.13 |
| 6,161,896 | A * | 12/2000 | Johnson et al. | 297/188.1 |
| 6,390,547 | B1 * | 5/2002 | Spykerman | 297/188.1 |
| 6,488,327 | B1 * | 12/2002 | Pearse et al. | 296/65.05 |
| 6,796,469 | B2 * | 9/2004 | Lofaro | 224/275 |
| 6,824,029 | B2 * | 11/2004 | Tuel et al. | 224/275 |
| 6,869,121 | B2 * | 3/2005 | Kayumi et al. | 296/37.15 |
| 6,877,807 | B2 * | 4/2005 | Mizuno et al. | 297/188.1 |
| 6,981,730 | B2 * | 1/2006 | Bixby | 296/37.15 |
| 2004/0134946 | A1 * | 7/2004 | Gammon | 224/275 |
| 2008/0093874 | A1 * | 4/2008 | Partch | 296/37.15 |
| 2009/0115229 | A1 * | 5/2009 | Messner et al. | 297/188.1 |

FOREIGN PATENT DOCUMENTS

| | | |
|---|---|---|
| JP | 2-23242 | 2/1990 |
| JP | 02-220936 | 9/1990 |
| JP | 07-242141 | 9/1995 |
| JP | 2006-025842 | 2/2006 |

* cited by examiner

*Primary Examiner* — Jason S Morrow
(74) *Attorney, Agent, or Firm* — Rankin, Hill & Clark LLP

(57) ABSTRACT

A seat-form storage apparatus for preventing a passenger from sitting on a portion for storage. A protruding part protruding from a vertical wall part toward a concave storage part is provided. The protruding part prevents sitting on the concave storage part.

18 Claims, 6 Drawing Sheets

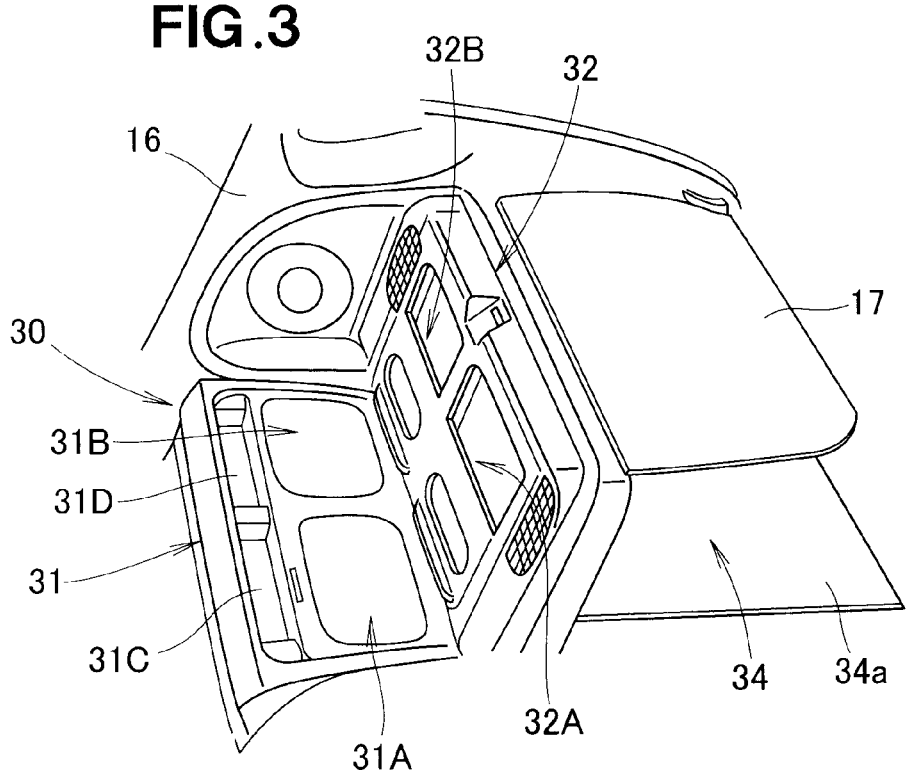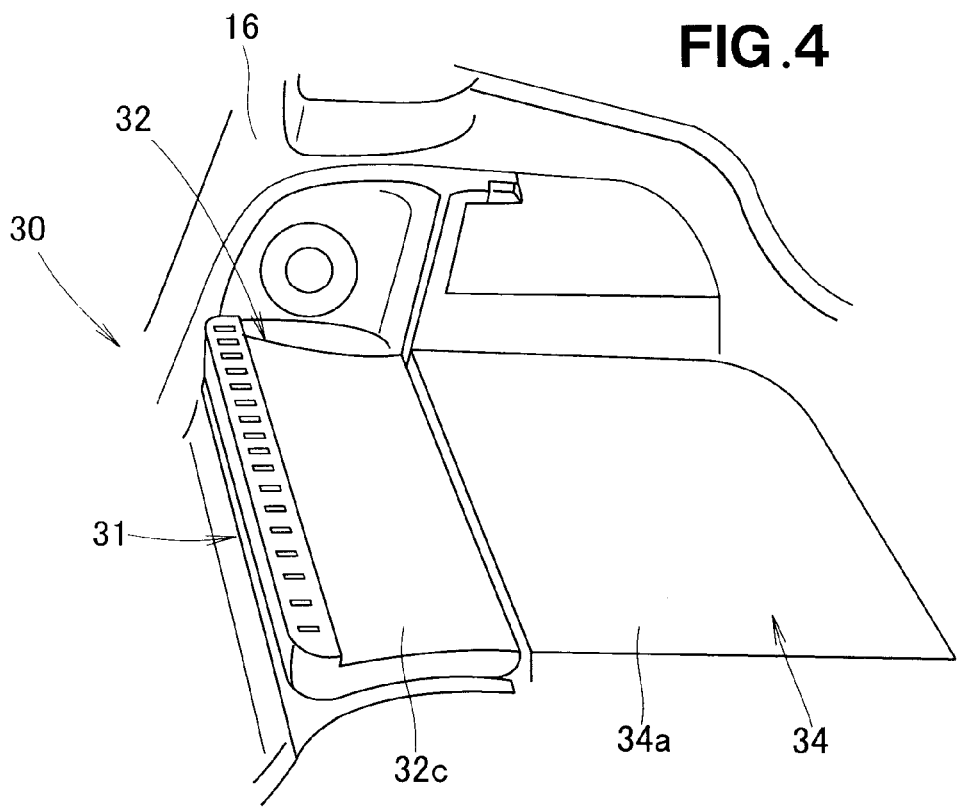

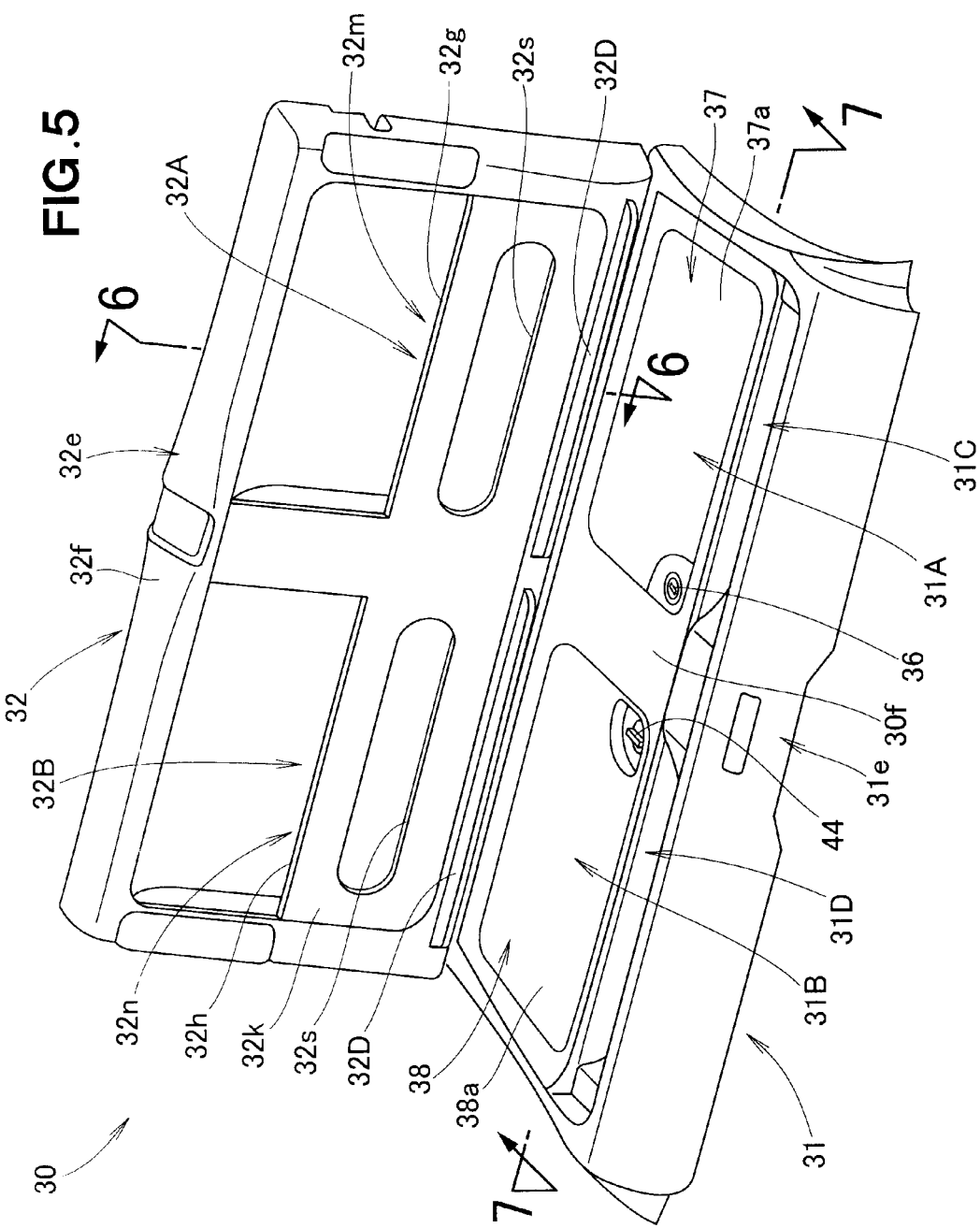

SEAT-FORM STORAGE APPARATUS

FIELD OF THE INVENTION

The present invention relates to a seat-form storage apparatus adapted to be disposed on a vehicle.

BACKGROUND OF THE INVENTION

Disclosed in, e.g., Japanese Patent Application Laid-Open Publication No. 2-220936 (JP 02-220936 A) is a well-known seat-form storage apparatus in which the portion that is normally used as a passenger seat is removed, thereby forming a storage part for objects.

FIG. 8 hereof shows the seat that is disclosed in JP 02-220936 A and is capable of storing objects.

As can be seen in the drawing, a seat cushion 101 and a seat-back 102 that constitute a rear seat 100 of an automotive vehicle have been removed, and openable lids 104 are attached to respective concave parts 103, 103 formed in the portions from which the seat cushion 101 was removed, whereby a storage space is formed.

Since passengers might think that the concave parts 103 for storing objects are seats, measures for preventing the passengers sitting there must be implemented.

SUMMARY OF THE INVENTION

It is an object of the present invention to provide a seat-form storage apparatus for preventing a passenger from sitting on the portion for storing objects.

According to the present invention, there is provided a seat-form storage apparatus, comprising a horizontal wall part having a concave storage part, the horizontal wall part extending horizontally along a floor; a vertical wall part extending vertically from an end part of the horizontal wall part; and a protruding part protruding from the vertical wall part toward an upper portion of the concave storage part.

The protruding part thus protrudes from the vertical wall part to an upper portion of the concave storage part, whereby, when a passenger attempts to sit on the concave storage part, the protruding part acts as an obstructing rib, and the passenger is prevented from sitting on the concave storage part.

Preferably, the protruding part is provided across a widthwise direction of the concave storage part. The protruding part will therefore obstruct the sitting of the passenger and prevent sitting regardless of the position in the widthwise direction of the concave storage part in which the passenger attempts to sit.

Desirably, the vertical wall part has a storage pocket provided to a surface facing the concave storage part. The storage pocket therefore makes sitting difficult and prevents passengers from regarding it as a place to sit.

BRIEF DESCRIPTION OF THE DRAWINGS

Certain preferred embodiments of the present invention will be described in detail below, by way of example only, with reference to the accompanying drawings, in which:

FIG. 3 is a perspective view showing the rear part of the passenger compartment along with a luggage compartment and a seat-form storage apparatus according to second embodiment of the present invention;

FIG. 4 is a perspective view showing the rear part of the passenger compartment and the luggage compartment of FIG. 3 with a backboard lowered forward;

FIG. 5 is a perspective view showing the seat-form storage apparatus of FIG. 3;

DETAILED DESCRIPTION OF THE PREFERRED EMBODIMENTS

Figure 1:
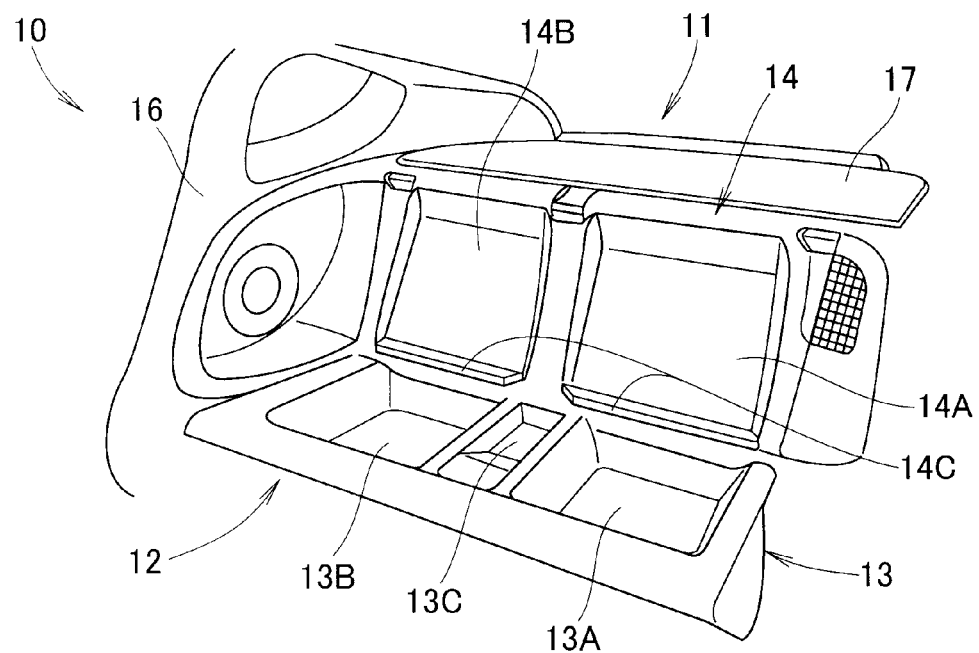
FIG. 1 is a perspective view showing a rear part of a passenger compartment with a seat-form storage apparatus according to a first embodiment of the present invention.

As shown in FIG. 1, a seat-form storage apparatus 12 according to a first embodiment of the present invention is provided to the rear part of a passenger compartment 11 of an automotive vehicle 10.

The seat-form storage apparatus 12 is provided with a rear tray (horizontal wall part) 13 that extends horizontally in the widthwise direction of the vehicle along a rear floor (floor) 21; and a backboard (vertical wall part) 14 that stands substantially straight up on the rear part of the rear tray 13.

The rear tray 13 has a pair of left and right large concave storage parts 13A, 13B that form downward depressions so as to allow the mounting of large objects; and a small concave storage part 13C that forms a downward depression so as to allow the mounting of small objects between the large concave storage parts 13A, 13B.

The backboard 14 supports the rear part of objects mounted in the left and right large concave storage parts 13A, 13B of the rear tray 13. The backboard 14 is positioned behind the large concave storage parts 13A, 13B and has a pair of left and right concave supporting parts 14A, 14B that form a depression to the rear so as to support the rear part of the objects; and left and right protruding parts 14C, 14C that protrude from the respective lower edges of the left and right concave supporting parts 14A, 14B toward respective upper portions of the large concave storage parts 13A, 13B of the rear tray 13. The protruding parts 14C, 14C extend to a position farther forward than the rear wall that forms the large concave storage parts 13A, 13B.

A tonneau cover 17 covers the cargo in the luggage compartment provided behind the backboard 14. Reference number 16 is an inner wall that forms the passenger compartment 11.

Figure 2:
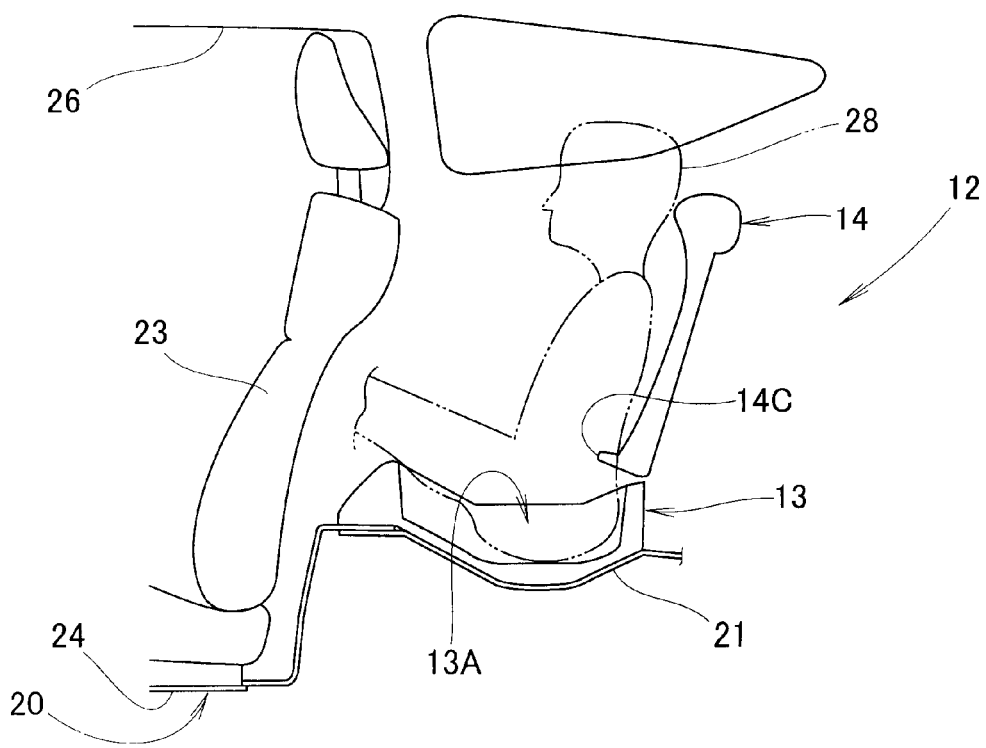
FIG. 2 is a side elevational view showing the rear part of the passenger compartment with the seat-form storage apparatus of FIG. 1.

The rear tray 13 is attached so as to follow along the rear floor 21 on the upper surface of the rear floor 21, which constitutes an underbody 20, as shown in FIG. 2. The backboard 14 is attached to a rear end part of the rear tray 13 so as to be capable of swinging forward and backward and so as to be capable of being locked at a predetermined angle. Reference number 23 is a front seat, 24 is a front floor, and 26 is a front-door aperture.

The protruding parts 14C that protrude to upper portions of the large concave storage parts 13A, 13B (only the front symbol 13A is shown) of the rear tray 13 are provided to the backboard 14, and therefore the protruding parts 14C, e.g., contact and obstruct the back and prevent sitting, even when a child 28 attempts to sit on the large concave storage parts 13A, 13B.

A seat-form storage apparatus according to a second embodiment of the present invention will be described next with reference to FIGS. 3 through 7. The same notation will be applied to members that are the same as members of first embodiment shown in FIGS. 1 and 2, and descriptions thereof will be omitted.

As shown in FIG. 3, a seat-form storage apparatus 30 according to a second embodiment of he present invention is composed of a rear tray (horizontal wall part) 31 that allows objects to be mounted and that has left and right storage compartments 31A, 31B for storing objects; and a backboard (vertical wall part) 32 that is positioned so as to stand vertically on a rear-end part of the rear tray 31, supports the rear part of objects mounted on the rear tray 31, and has left and right storage pockets 32A, 32B for storing objects. A luggage compartment 34 is provided behind the backboard 32. The backboard 32 is attached to the vehicle body so as to be capable of swinging forward and backward and is shown locked in an upright state in FIG. 3.

FIG. 4 shows a state in which the backboard 32 has been lowered forward from the upright state of FIG. 3 and overlaid onto the rear tray 31. When the backboard 32 is lowered forward, a back surface 32c of the backboard 32 forms a flat surface that is continuous with the surface of a bottom 34a of the luggage compartment 34. The luggage compartment 34 is therefore expanded, and larger pieces of luggage can be loaded.

The rear tray 31 of the seat-form storage apparatus 30 is provided with the pair of left and right storage compartments 31A, 31B and concave storage parts 31C, 31D that are positioned in front of the storage compartments 31A, 31B, as shown in FIG. 5.

The left storage compartment 31A is covered by a left cover 37 that is detachably provided to a rear-tray body 31e formed by the left and right concave storage parts 31C, 31D so as to be able to be locked by a locking mechanism 36. An upper surface 37a of the left cover 37 is formed as a flat surface that is continuous with an upper surface 30f of the rear-tray body 31e.

The right storage compartment 31B is covered by a right cover 38 that is detachably and interlockably provided to the rear-tray body 31e. An upper surface 38a of the right cover 38 is formed as a flat surface that is continuous with an upper surface 30f of the rear-tray body 31e.

The left storage compartment 31A can be locked by the locking mechanism 36 and is therefore appropriate for storing valuables, important objects, and the like. The storage compartment 31B is structured to be readily opened and is therefore appropriate for storing soiled objects, wet clothes, raincoats, and the like.

The concave storage parts 31C, 31D are both formed long so as to extend in the widthwise direction of the vehicle and are therefore appropriate for storing objects that are small or long and thin.

The backboard 32 is provided with the pair of left and right storage pockets 32A, 32B and a pair of left and right protruding parts 32D, 32D that protrude from below the storage pockets 32A, 32B toward the area above the storage compartments 31A, 31B of the rear tray 31. The protruding parts 32D, 32D extend to a position that is farther forward than the rear wall that forms the storage compartments 31A, 31B.

The storage pockets 32A, 32B are provided with a backboard body 32e and a pocket panel 32k that is positioned in front of the backboard body 32e and that has upper edge parts 32g, 32h at a position that is lower than an upper end part 32f of the backboard body 32e. The storage pockets 32A, 32B have aperture parts 32m, 32n that open upward on the upper inner sides of the upper edge parts 32g, 32h, respectively.

Figure 6:
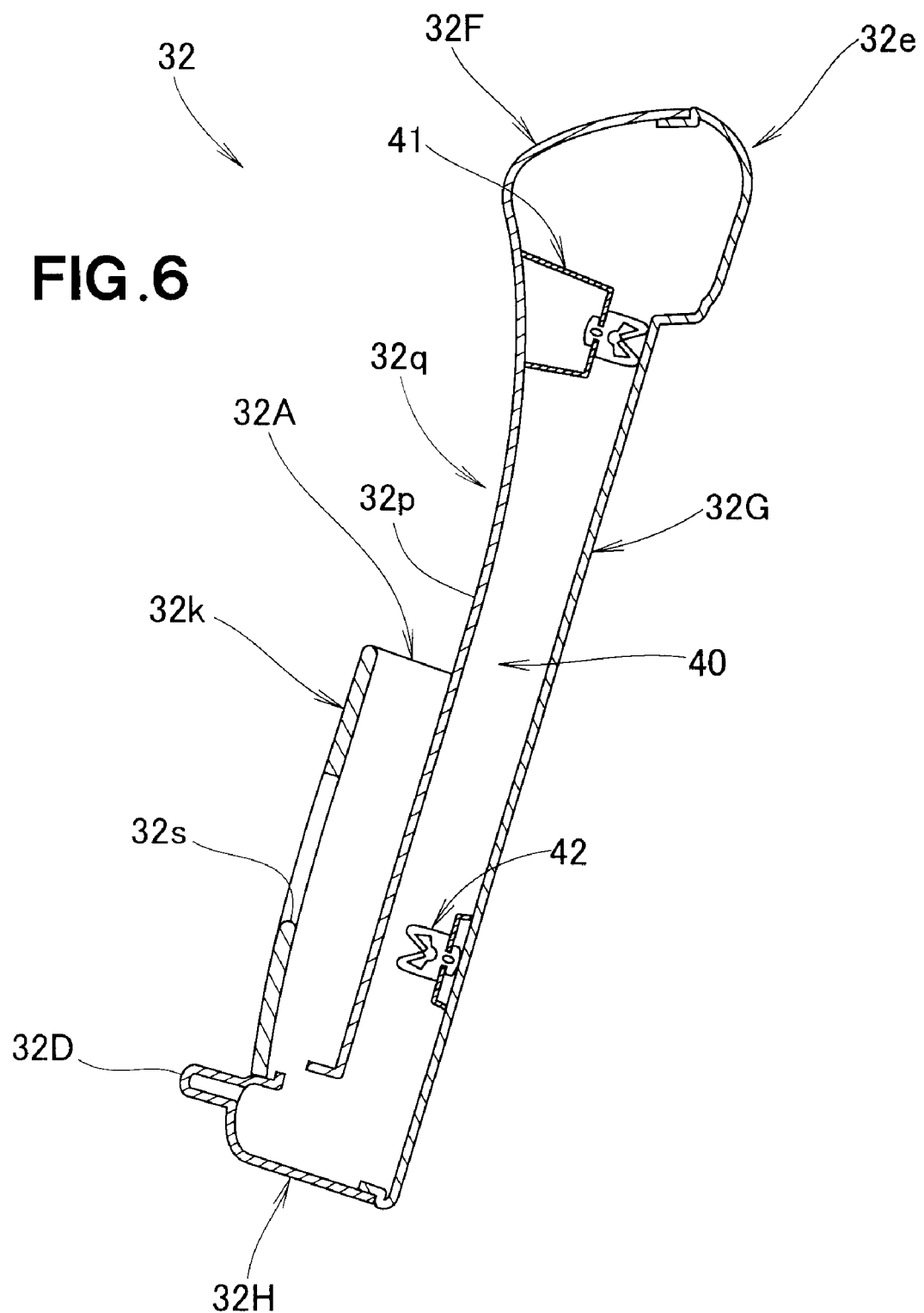
FIG. 6 is a cross-sectional view taken along line 6-6 of FIG. 5.

The backboard body 32e is composed of a front panel 32F, a rear panel 32G that is attached to a rear part of the front panel 32F, and a lower panel 32H that is attached to lower ends of both the front panel 32F and the rear panel 32G, as shown in FIG. 6. Supporting members 41, 42 are provided to the front panel 32F and the rear panel 32G, respectively, so as to be positioned in a space 40 formed by the front panel 32F and the rear panel 32G.

A concave backboard part 32q that forms a depression with respect to the upper and lateral end parts of the front panel 32F is formed on a front surface 32p of the front panel 32F. The pocket panel 32k is provided to a separate structure from the backboard body 32e. A window part 32s opens in the middle of the pocket panel 32k in the vertical direction. Objects stored within the storage pockets 32A, 32B can be seen through the window part 32s from the outside.

The protruding part 32D is formed integrally with the front part of the lower panel 32H so as to protrude forward. Specifically, the protruding part 32D is formed adjoining the portion where the lower edge of the pocket panel 32k contacts the lower panel 32H.

Figure 7:
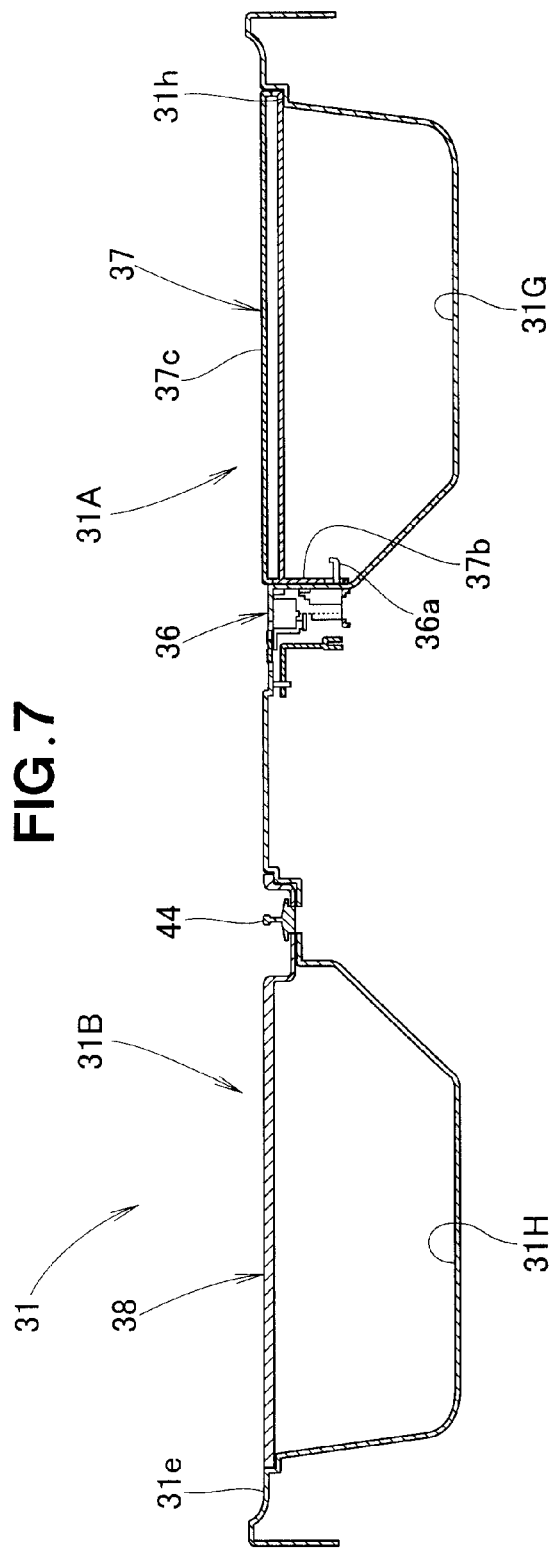
FIG. 7 is a cross-sectional view taken along line 7-7 of FIG. 5.
Figure 8:
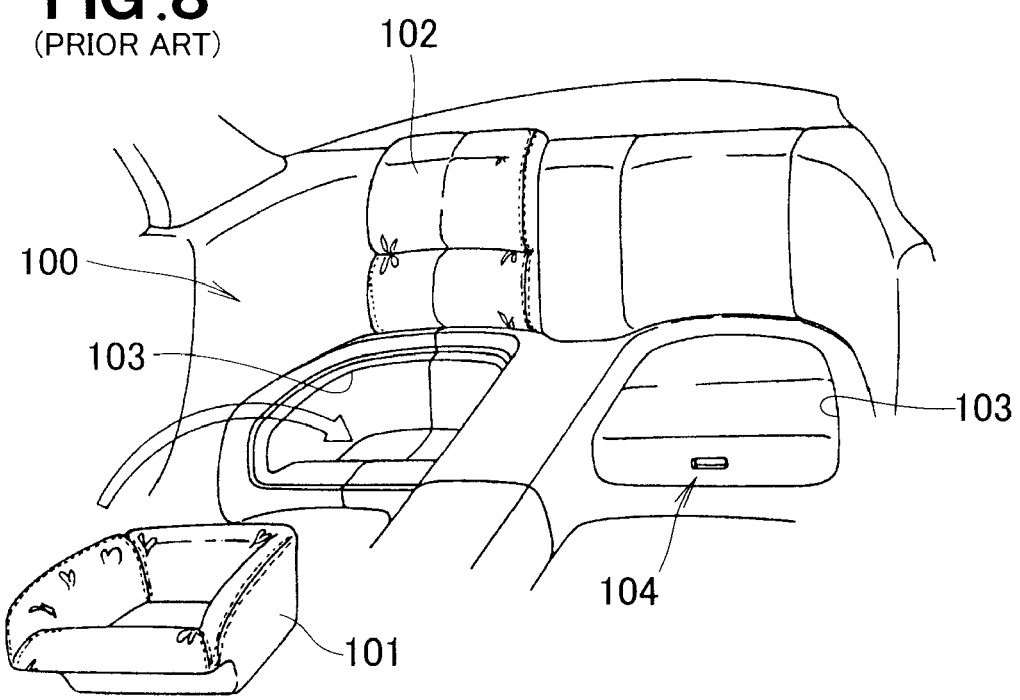
FIG. 8 is a perspective view showing a rear part of a passenger compartment along with a conventional seat-form storage apparatus.

The rear tray 31 has a pair of left and right large concave storage parts 31G, 31H that are formed on the rear-tray body 31e, as shown in FIG. 7. The left and right covers 37, 38 block the upper openings of the left and right large concave storage parts 31G, 31H.

The locking mechanism 36 is positioned on a lateral wall of the left large concave storage part 31G toward the inside in the widthwise direction of the vehicle and is provided with an engagement part 36a that can engage with an inside hanging wall 37b of the left cover 37. The inside hanging wall 37b of the left cover 37 engages with the engagement part 36a, whereby the left cover is locked and prevented from opening.

The left cover 37 is composed of a top plate 37c having a vertically double-layered structure, and the inside hanging wall 37b that extends down from an inside end part of the top plate 37c. A plurality of interlocking parts (not shown) that interlock with an upper-edge step part 31h formed on the left large concave storage part 31G is formed on the rim of the top plate 37c. The left cover 37 therefore has a double-layered structure, whereby strength and rigidity with respect to external impact are increased, and the effect of preventing theft of the objects stored in the left storage compartment 31A can be enhanced.

The right cover 38 has a single-layer structure and is provided with a knob 44 in a corner part. The knob 44 can be pulled upward, whereby the interlocked state of the right cover 38 and the rear-tray body 31e is released, and the right cover 38 can be opened.

As shown in the aforedescribed FIGS. 1 and 2, in the seat-form storage apparatus 12 provided with the rear tray 13, which acts as the horizontal wall part that has the large concave storage parts 13A, 13B that extend horizontally along the rear floor 21 that acts as the floor and that act as the concave storage parts; and the backboard 14, which acts as the vertical wall part that extends vertically from an end part of the rear tray 13, the protruding parts 14C, 14C are provided so as to extend from the backboard 14 toward the area above the large concave storage parts 13A, 13B. The protruding parts 14C therefore function as obstructing ribs and can prevent a passenger from sitting on the large concave storage parts 13A, 13B.

The protruding parts 14C are provided across the large concave storage parts 13A. 13B in the widthwise direction of the vehicle, and therefore passengers will be prevented from sitting in any position of the large concave storage parts 13A, 13B.

As shown in the aforedescribed FIGS. 5 through 7, the storage pockets 32A, 32B of the backboard 32 are provided to surfaces facing the large concave storage parts 31G, 31H that act as the concave storage parts, and therefore the seat-form storage apparatus 30 can be prevented from being mistaken for a seat.

In the second embodiment, the protruding part 32D was provided below the backboard body 32e, as shown in FIG. 6, but this example is not given by way of limitation, and the protruding part may also be provided below the pocket panel 32k.

Obviously, various minor changes and modifications of the present invention are possible in light of the above teaching. It is therefore to be understood that within the scope of the appended claims the invention may be practiced otherwise than as specifically described.

What is claimed is:

1. A seat-form storage apparatus comprising:
    a horizontal wall part extending horizontally along a floor and having a concave storage part;
    a vertical wall part extending vertically from an end part of the horizontal wall part; and
    a protruding part protruding from the vertical wall part toward an upper portion of the concave storage part, the protruding part on the vertical wall having a distal end portion disposed directly above the concave storage part,
    wherein the vertical wall part is swingable forward and backward around the end part of the horizontal wall part and the protruding part protrudes from the vertical wall part toward a downward direction when the vertical wall part swings forward and extends horizontally from the end part of the horizontal wall part.

2. The storage apparatus of claim 1, wherein the protruding part is provided across a widthwise direction of the concave storage part.

3. The storage apparatus of claim 1, wherein the vertical wall part has a storage pocket provided to a surface facing the concave storage part.

4. The storage apparatus of claim 1, wherein the horizontal wall part has two concave storage parts.

5. The storage apparatus of claim 1, wherein the horizontal wall part has three concave storage parts.

6. The storage apparatus of claim 1, wherein the horizontal wall part has three concave storage parts, an area of one of the three concave storage parts is smaller than areas of two other concave storage parts, and the small concave storage part is located between the two large concave storage parts.

7. A seat-form storage apparatus comprising:
    a horizontal wall part extending horizontally along a floor and having a concave storage part;
    a vertical wall part extending vertically from an end part of the horizontal wall part; and
    a protruding part protruding from the vertical wall part toward an upper portion of the concave storage part, the protruding part on the vertical wall having a distal end portion disposed directly above the concave storage part,
    wherein the vertical wall part is swingable forward and backward around the end part of the horizontal wall part, the vertical wall part has a back surface, and the back surface forms a flat surface that is continuous with a bottom surface of a luggage compartment when the vertical wall part swings forward and extends horizontally from the end part of the horizontal wall part.

8. A seat-form storage apparatus comprising:
    a horizontal wall part extending horizontally along a floor and having a concave storage part;
    a vertical wall part extending vertically from an end part of the horizontal wall part;
    a protruding part protruding from the vertical wall part toward an upper portion of the concave storage part, the protruding part on the vertical wall having a distal end portion disposed directly above the concave storage part; and
    a cover that is detachably provided to the horizontal wall part to cover the concave storage part.

9. The storage apparatus of claim 8, wherein an upper surface of the cover forms a flat surface that is continuous with an upper surface of the horizontal wall part.

10. The storage apparatus of claim 4, wherein the protruding part is provided for each of the two concave storage parts.

11. The storage apparatus of claim 6, wherein the protruding part is provided for each of the two large concave storage parts.

12. The storage apparatus of claim 2, wherein the concave storage part has a length in the widthwise direction thereof, and the protruding part has a length in the widthwise direction of the concave storage part, and the length of the protruding part is larger than the length of the concave storage part.

13. A seat-form storage apparatus comprising:
    a horizontal wall part extending horizontally along a floor and having a concave storage part;
    a vertical wall part extending from an end part of the horizontal wall part, the vertical wall swinging forward and backward around the end part of the horizontal wall; and
    a protruding part on the vertical wall part, the protruding part protruding from the vertical wall part toward an upper portion of the concave storage part when the vertical wall part swings backward and extends vertically from the end part of the horizontal wall part.

14. The storage apparatus of claim 13, wherein the protruding part protrudes from the vertical wall part toward a downward direction when the vertical wall part swings forward and extends horizontally from the end part of the horizontal wall part.

15. The storage apparatus of claim 13, wherein the horizontal wall part has three concave storage parts, an area of one of the three concave storage parts is smaller than areas of two other concave storage parts, and the small concave storage part is located between the two large concave storage parts.

16. The storage apparatus of claim 13, wherein the vertical wall part has a back surface and the back surface forms a flat surface that is continuous with a bottom surface of a luggage compartment when the vertical wall part swings forward and extends horizontally from the end part of the horizontal wall part.

17. The storage apparatus of claim 13, further comprising:
    a cover that is detachably provided to the horizontal wall part to cover the concave storage part, an upper surface of the cover forming a flat surface that is continuous with an upper surface of the horizontal wall part.

18. The storage apparatus of claim 13, wherein the vertical wall part has a concave supporting part that supports a rear part of an object that is mounted in the concave storage part of the horizontal wall part.

* * * * *